(12) United States Patent
Kim

(10) Patent No.: US 7,933,619 B2
(45) Date of Patent: Apr. 26, 2011

(54) WIRELESS CONTROL OF ACCESS POINTS

(75) Inventor: Woojune Kim, Arlington, MA (US)

(73) Assignee: Airvana, Corp., Chelmsford, MA (US)

( * ) Notice: Subject to any disclaimer, the term of this patent is extended or adjusted under 35 U.S.C. 154(b) by 784 days.

(21) Appl. No.: 11/866,238

(22) Filed: Oct. 2, 2007

(65) Prior Publication Data

US 2009/0088155 A1    Apr. 2, 2009

(51) Int. Cl.
*H04B 7/00* (2006.01)
(52) U.S. Cl. .......... 455/515; 455/552.1; 455/435.1; 455/434; 455/420
(58) Field of Classification Search .......... 455/561, 455/445, 450, 435.1, 458, 433, 567, 550.1, 455/414.1, 419, 54.2, 33.1, 54.1, 411, 556.1, 455/415; 379/88.14; 709/206, 204; 707/101
See application file for complete search history.

(56) References Cited

U.S. PATENT DOCUMENTS

| | | | |
|---|---|---|---|
| 6,711,144 B1 | 3/2004 | Kim et al. | |
| 6,731,618 B1 | 5/2004 | Chung et al. | |
| 6,741,862 B2 | 5/2004 | Chung et al. | |
| 6,781,999 B2 | 8/2004 | Eyuboglu et al. | |
| 6,914,965 B1* | 7/2005 | Grob et al. | 455/422.1 |
| 7,170,871 B2 | 1/2007 | Eyuboglu et al. | |
| 7,200,391 B2 | 4/2007 | Chung et al. | |
| 7,242,958 B2 | 7/2007 | Chung et al. | |
| 7,277,446 B1 | 10/2007 | Abi-Nassif et al. | |
| 7,299,278 B2 | 11/2007 | Ch'ng | |
| 7,480,619 B1* | 1/2009 | Scott | 704/275 |
| 2002/0196749 A1 | 12/2002 | Eyuboglu et al. | |
| 2003/0100311 A1 | 5/2003 | Chung et al. | |
| 2004/0002337 A1* | 1/2004 | Wheeler et al. | 455/445 |
| 2005/0071169 A1* | 3/2005 | Steinbiss | 704/275 |
| 2005/0104717 A1* | 5/2005 | Kaplan | 340/5.74 |
| 2005/0213555 A1 | 9/2005 | Eyuboglu et al. | |
| 2005/0243749 A1 | 11/2005 | Mehrabanzad et al. | |
| 2005/0245279 A1 | 11/2005 | Mehrabanzad et al. | |
| 2006/0067422 A1 | 3/2006 | Chung | |
| 2006/0067451 A1 | 3/2006 | Pollman et al. | |
| 2006/0126509 A1 | 6/2006 | Abi-Nassif | |
| 2006/0159045 A1 | 7/2006 | Ananthaiyer et al. | |
| 2006/0212136 A1 | 9/2006 | Lee et al. | |
| 2006/0240782 A1 | 10/2006 | Pollman et al. | |
| 2006/0270463 A1* | 11/2006 | Copperman | 455/567 |

(Continued)

FOREIGN PATENT DOCUMENTS

EP          1209942          5/2002

(Continued)

OTHER PUBLICATIONS

Ferguson, Andrew, "Netgear DG834G ADSL Modem/Wireless Router Review", Internet Citation, XP00245820, URL:http://www.thinkbroadband.com/hardware/reviews/2004/q3/netgear-dg834g.ht, retrieved on Aug. 16, 2007.

(Continued)

*Primary Examiner* — Tan Trinh
(74) *Attorney, Agent, or Firm* — Fish & Richardson P.C.

(57) ABSTRACT

A method including wirelessly receiving a communication from a wireless device at a receiving device where the communication designated for transmission through the receiving device, recognizing a non-address portion of the communication as indicative of a command for the receiving device, and terminating the communication at the receiving device.

26 Claims, 3 Drawing Sheets

U.S. PATENT DOCUMENTS

| | | |
|---|---|---|
| 2006/0291420 A1 | 12/2006 | Ng |
| 2006/0294241 A1 | 12/2006 | Cherian et al. |
| 2007/0026884 A1 | 2/2007 | Rao |
| 2007/0054668 A1* | 3/2007 | Scheinert et al. .......... 455/435.1 |
| 2007/0058628 A1 | 3/2007 | Palnati et al. |
| 2007/0077935 A1* | 4/2007 | Kloppel et al. ............... 455/450 |
| 2007/0077948 A1 | 4/2007 | Sharma et al. |
| 2007/0097916 A1 | 5/2007 | Eyuboglu et al. |
| 2007/0115896 A1 | 5/2007 | To et al. |
| 2007/0140172 A1 | 6/2007 | Garg et al. |
| 2007/0140184 A1 | 6/2007 | Garg et al. |
| 2007/0140185 A1 | 6/2007 | Garg et al. |
| 2007/0140218 A1 | 6/2007 | Nair et al. |
| 2007/0155329 A1 | 7/2007 | Mehrabanzad et al. |
| 2007/0162762 A1 | 7/2007 | Huh et al. |
| 2007/0200658 A1 | 8/2007 | Yang |
| 2007/0220573 A1 | 9/2007 | Chiussi et al. |
| 2007/0230419 A1 | 10/2007 | Raman et al. |
| 2007/0238442 A1 | 10/2007 | Mate et al. |
| 2007/0238476 A1 | 10/2007 | Sharma et al. |
| 2007/0242648 A1 | 10/2007 | Garg et al. |
| 2007/0248042 A1 | 10/2007 | Harikumar et al. |
| 2007/0259657 A1* | 11/2007 | Cheng ........................... 455/419 |
| 2008/0003988 A1 | 1/2008 | Richardson |
| 2008/0013488 A1 | 1/2008 | Garg et al. |
| 2008/0022043 A1* | 1/2008 | Adams et al. ................. 711/115 |
| 2008/0062925 A1 | 3/2008 | Mate et al. |
| 2008/0065752 A1 | 3/2008 | Ch'ng et al. |
| 2008/0069020 A1 | 3/2008 | Richardson |
| 2008/0069028 A1 | 3/2008 | Richardson |
| 2008/0076398 A1 | 3/2008 | Mate et al. |
| 2008/0109462 A1* | 5/2008 | Adams et al. ................. 707/101 |
| 2008/0117842 A1 | 5/2008 | Rao |
| 2008/0119172 A1 | 5/2008 | Rao et al. |
| 2008/0120417 A1 | 5/2008 | Harikumar et al. |
| 2008/0139203 A1 | 6/2008 | Ng et al. |
| 2008/0146232 A1 | 6/2008 | Knisely |
| 2008/0151843 A1 | 6/2008 | Valmikam et al. |
| 2008/0159236 A1 | 7/2008 | Ch'ng et al. |
| 2008/0162924 A1 | 7/2008 | Chinitz et al. |
| 2008/0162926 A1 | 7/2008 | Xiong et al. |
| 2008/0253550 A1 | 10/2008 | Ch'ng et al. |
| 2008/0254792 A1 | 10/2008 | Ch'ng |
| 2009/0034440 A1 | 2/2009 | Samar et al. |
| 2009/0163191 A1* | 6/2009 | Henderson .................... 455/415 |
| 2010/0185742 A1* | 7/2010 | Miyagi et al. ................. 709/206 |

FOREIGN PATENT DOCUMENTS

| | | |
|---|---|---|
| GB | 2452688 | 3/2009 |
| GB | 2466155 | 6/2010 |
| WO | WO 00/01177 | 1/2000 |
| WO | WO 2004/040938 | 5/2004 |
| WO | WO 2009/046159 | 4/2009 |

OTHER PUBLICATIONS

International Search Report and Written Opinion from corresponding PCT Application No. PCT/US2008/078527, mailed Jan. 21, 2009 (31 pages).

International Preliminary Report on Patentability for PCT application No. PCT/US2008/078527 mailed Apr. 15, 2010 (9 pages).

Sprint: User Guide: Sprint AIRAVE; www.sprint.com; 2007: pp. 1-48.

Ziegler, Chris: Hands-on with the Samsung Ubicell; Engadget; Mar. 28, 2007; http://www.engadget.com/2007/03/28/hands-on-with-the-samsung-ubicell; pp. 1-4.

U.S. Appl. No. 11/735,107, filed Apr. 13, 2007, Inventor(s): Ch'ng et al.

U.S. Appl. No. 11/735,073 filed Apr. 13, 2007, Inventor(s): Ch'ng et al.

U.S. Appl. No. 11/903,742, filed Sep. 24, 2007, Inventor(s): Ch'ng et al.

* cited by examiner

WIRELESS CONTROL OF ACCESS POINTS

BACKGROUND

This disclosure relates to wirelessly controlling access points, such as cellular base stations, wireless routers, and other devices that enable wireless communication.

Wireless communication plays an important role in modern life. Wireless telephones have become a part of virtually every sector of society and wireless access to electronic mail, the Internet, and appliances is not far behind. Although most people take wireless access—especially with telephones—for granted, many types of wireless communication would not be possible without wireless access points, such as base stations, that enable wireless communication. As such, as wireless communications becomes more ubiquitous, so do these access points. In fact, many types of access points are now being employed in individual homes or businesses. For example, a relatively new type of access point, known as a "femto cell" or personal access point is designed to provide cellular services to individual homes and businesses.

As access points become more "personal," users often wish to modify their properties or settings. Typically, this is done by tracking down the access point and physically attaching a cable between the access point and a computer or laptop.

SUMMARY

In some embodiments, there is provided a method including receiving a communication from a wireless device at a receiving device, the communication designated for transmission through the receiving device; recognizing a non-address portion of the communication as indicative of a command for the receiving device; and terminating the communication at the receiving device.

In another aspect, there is a base station having circuitry configured to receive a communication from a wireless device at a base station, wherein the communication is designated for transmission through the base station; circuitry configured to recognize the communication as a command for the base station; and circuitry configured to terminate the communication at the base station.

In still another embodiment, there is a method including receiving a communication over a command channel from a wireless device at a personal base station; recognizing a portion of the communication as indicative of a command for the personal base station; and executing the command at the personal base station.

In another aspect, there is provided a medium bearing instructions to cause a computer to process a communication received from a wireless device at a base station, wherein the communication is designated for transmission through the base station; recognize the communication as a command for the base station; and terminate the communication at the base station.

In yet another embodiment, there is a personal base station having a short message service server configured to receive text messages from a wireless device; and circuitry configured to recognize one or the more of the text messages as a command for the personal base station.

Advantages of the techniques disclosed herein include providing a simplified process for wirelessly controlling an access point by configuring the access point to recognize commands for that access point that are located within wireless communications that would otherwise be transmitted through the access point to an outside destination. Once recognized, the access point can terminate the communication and/or execute the command.

Other aspects may include these and other features and aspects, alone and in other combinations, expressed as apparatus, methods, program products, means for performing functions, and systems, and in other ways.

Other features and advantages will be apparent from the description and the claims.

DESCRIPTION

Figure 1:
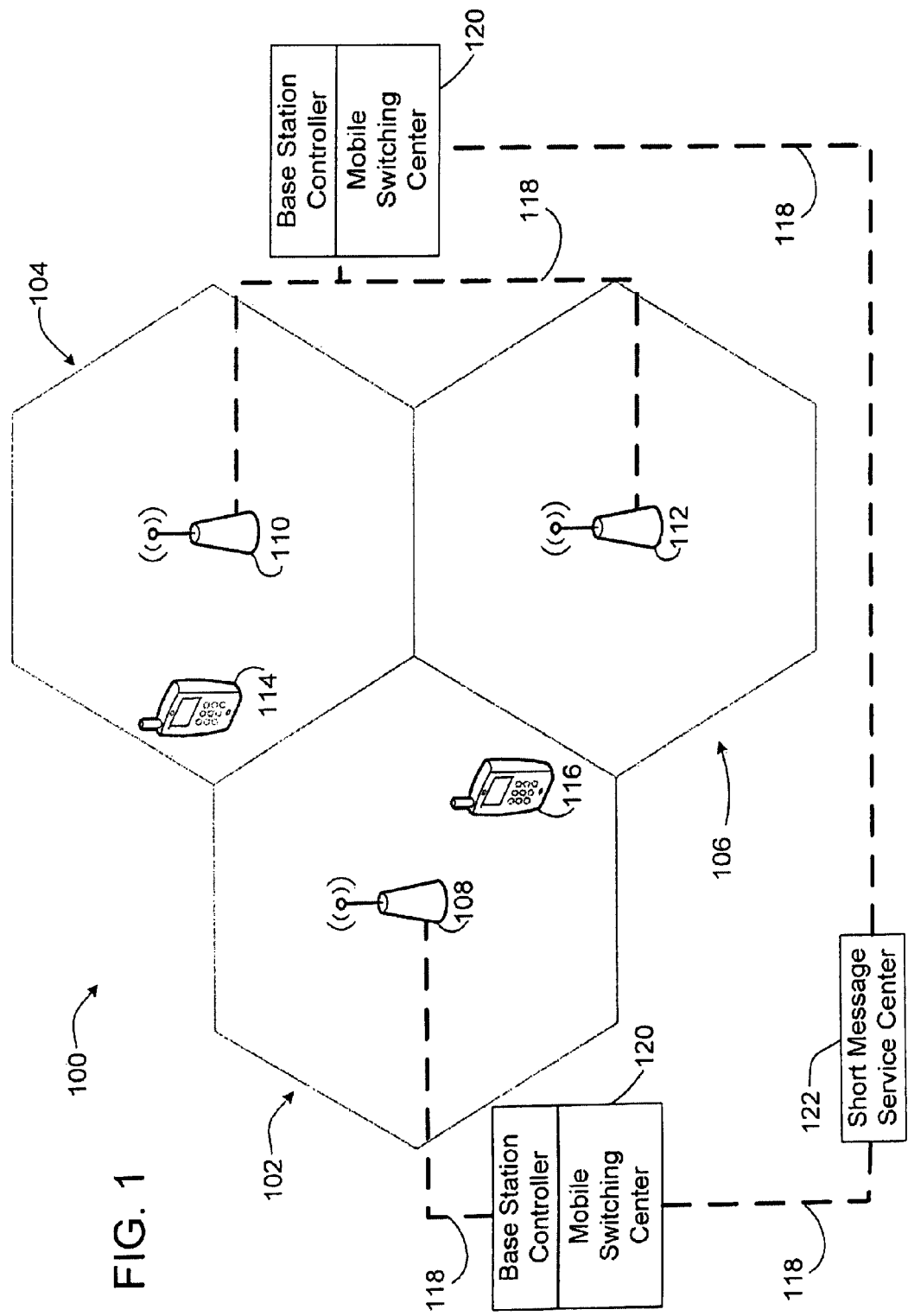
FIG. 1 is a block diagram of a radio access network.

Wireless communication systems are generally designed to serve many access terminals distributed in a large geographic area by dividing the area into a plurality of cells, as shown by the exemplary radio access network 100 of FIG. 1 which is divided into cells 102, 104, and 106. Located within each of the cells 102, 104, and 106 is a radio network access point 108, 110, and 112, also referred to as a base transceiver station ("BTS") or more colloquially as a "standard base station." The standard base stations 108, 110, and 112 serve as wireless network access points for wireless devices 114, 116 (e.g., cellular telephones, laptops, PDA's) that are located in that particular cell 102, 104, or 106.

Each of the standard base stations 108, 110, and 112 may have a variety of individual properties, such as a phase offset for its pilot signal (referred to as the "PN offset"), one or more transmission frequencies, an IP address, and/or a SectorID. The standard base stations 108, 110, and 112 may employ a number of suitable communication protocols, such as cdma2000 1xRTT, a protocol that was standardized by Telecommunications Industry Association ("TIA") as TIA/EIA/IS-2000. This standard is incorporated by reference. The radio access network 100 may also employ a variety of other suitable wireless communication protocols, including but not limited to, TIA/EIA/IS-95, Evolution-Data Optimized ("1xEV-DO"), Evolution Data and Voice ("EV-DV"), GSM, UMTS/High Speed Downlink Packet Access ("HSDPA"), IEEE 802.16 ("WiMax") and the like. Similarly, although this description uses terminology from the CDMA2000 IS-2000 standard, the same general concepts in radio and packet control are also available in other communication protocols, such as GSM, UMTS, HSDPA, and the like.

The standard base stations 108, 110, and 112 are connected over a backhaul connection 118 to a base station controller and mobile switching center ("BSC/MSC node") 120, which may be one or more physical devices at different locations. The BSC/MSC node 120 may be connected to a Short Message Service Center ("SMSC") 122. The SMSC 122 is configured to receive short message service ("SMS") messages, which are also referred to as text messages. For example, the SMSC may receive text messages from the BSC/MSC node 120 over the backhaul 118 and route these text messages to their appropriate destination (i.e., another wireless device in the network 100). In various embodiments, the SMSC 122 may be a free-standing system, as pictured in FIG. 1, or may be integrated into another part of the network 100 system, such as the BSC/MSC node 120 or other suitable component.

Figure 2:
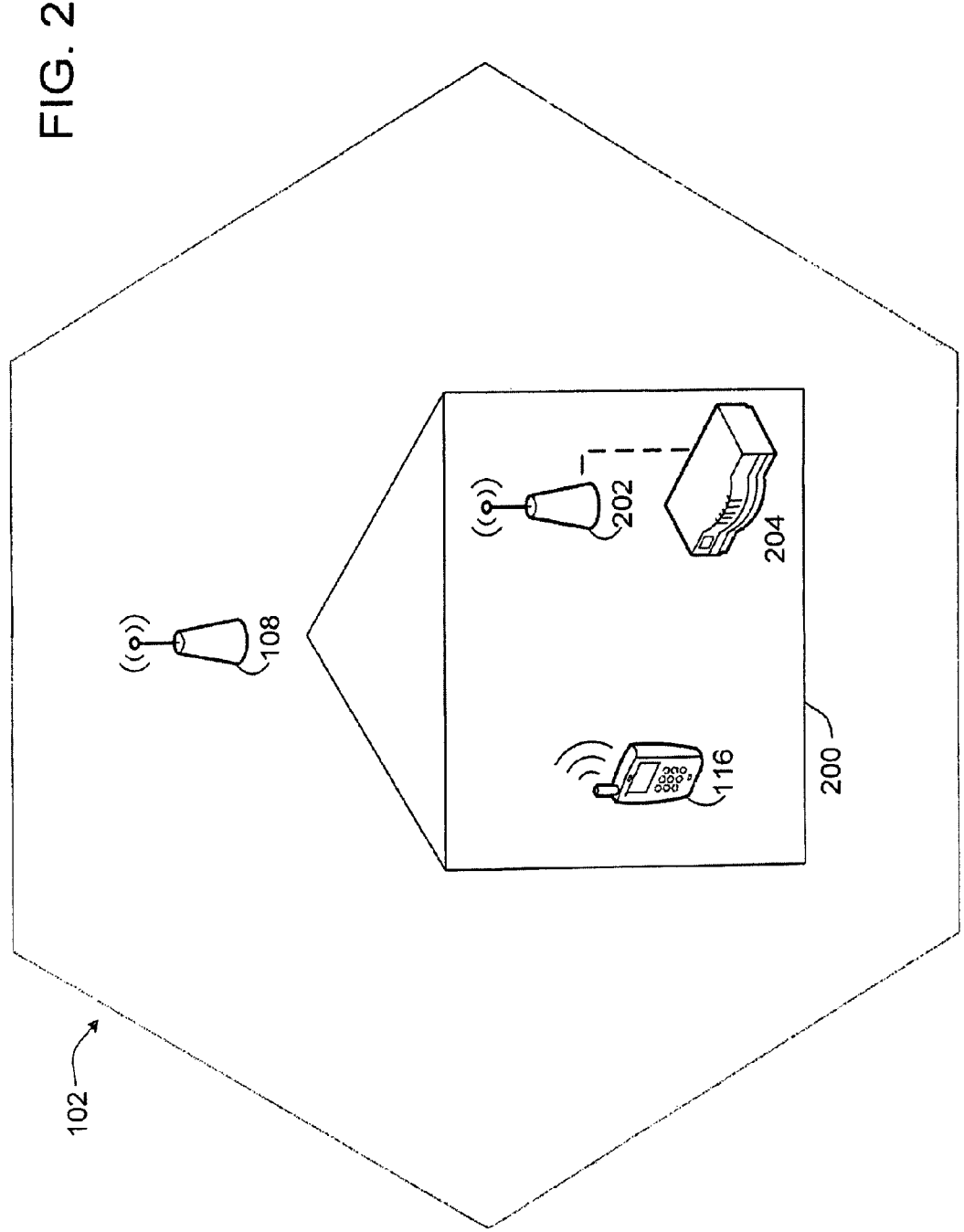
FIG. 2 is a block diagram of a home networking employment.

FIG. 2 illustrates a radio network access point 202 deployed into a user's home or business 200 in accordance with some embodiments. This type of access point is referred to as a personal access point or personal base station or "femto cell." The personal base station 202 may use an available high-speed Internet connection, such as DSL or cable modem 204, as its backhaul. The personal base station 202 is configured to implement BSC and parts of the MSC functionality to enable the modem 204 to backhaul the personal base station 202 to the network 100. The personal base station 202 may be installed in a variety suitable places, such as a home, an office, a public space, or a restaurant. The personal base station may also be integrated into the cable modem 204 or into another piece of home networking hardware, such as a router or WiFi access point.

Those of ordinary skill in the art will appreciate that the personal base station 202 differs from a "pico cell" access point because the personal base station 202 is intended to provide wireless access to only the user who installs it or those that user authorizes. On the other hand, a pico cell access point provides access to any subscriber of the network 100. Personal base stations also differ from WiFi access points because personal access points are intended to operate over licensed portions of the spectrum instead of or in addition to the publicly available portions of the spectrum that WiFi uses. Some details and examples of personal base stations, which are also known as "private access points" are discussed in co-pending application Ser. No. 11/640,501, titled "Provisioning Private Access Points For While Its Networking," and Ser. No. 11/640,503, titled "Configuring Preferred Users Own List For Private Access Points For Wireless Networking," both filed on Dec. 15, 2006 and both incorporated by reference.

When an authorized wireless device, such as the wireless device 116, is present inside the home 200 (or anywhere within range of the personal base station 202), it may use the personal base station 202 rather than a standard cellular radio network access point, such as the standard base station 108, to place or receive voice calls and make data connections. This is the case even though the wireless device 116 is still within the cell 102 of the base station 108. In this way, the personal base station 202 is configured to provide relatively localized wireless access (e.g., a single home or business). The personal base station 202 is also configured to provide access to a smaller subset of users than the standard base station 108. For example, the personal base station 202 serves its owner and those authorized by its owner versus the standard base station 108 which may serve any subscriber on the network 100.

These differences in scale between the standard base station 108 and the personal base station 202 also lead to differences in how the standard base station 108 and the personal base station 202 are controlled and who controls them. The standard base station 108 is typically installed by one or more technicians employed by the owner of the network 100 (e.g., a cellular service provider). The standard base station 108 is typically installed at a location designated specifically for it, such as a cell phone tower or dedicated control station. Further, because the standard base station 108 may serve hundreds or thousands of different users on a given day, individual users are not generally permitted to exercise any control over the properties or settings of the standard base station 108. These properties and settings are typically controlled by trained technicians either at the standard base station 108 itself on working remotely via the network 100.

The personal base station 202, on the other hand, may be installed within private homes or businesses by the purchaser of the personal base station 202. This purchaser is typically not employed or trained in the configuration of the personal base station 202. Moreover, because the personal base station 202 is intended to be accessed by its owner or other individuals authorized by the owner, the users are generally granted some measure of control over the properties and settings of the personal base station 202. For example, the personal base station 202 may be configured to allow the personal base station's owner to authorize or de-authorize particular wireless devices from accessing the network 100 through the personal base station 202. The personal base station may also be configured to allow the personal base station's user to turn on/off specific features in the personal base station, such as (1) enabling/disabling WiFi access point functionality; (2) adjusting specific features in the personal base station, such as changing max number of subscribers allowed on the system; (3) turning on/off/adjusting features of other household equipment that can be connected/controlled thru the internet, such as household appliances, lighting, fixtures, media equipment etc.; (4) asking internet web applications, such as e-mail to send you all you recent e-mail in an SMS format; (5) commanding other web applications to act, such as commanding the transfer all e-mail into a voicemail box or vice versa.

Allowing consumers access to the properties and settings of the personal base station 202, however, introduces challenges not typically faced in configuring the standard base station 108. For example, whereas a trained technician would have no problems hooking a laptop computer to the standard base station 108 and running configuration software, the typical consumer may find it challenging to perform these tasks successfully. Accordingly, one or more of the embodiments described herein enables wireless control of the personal access point 202. Further, in some embodiments, this wireless control is provided using existing consumer-friendly communication protocols, such as text messaging or standard phone calls.

Figure 3:
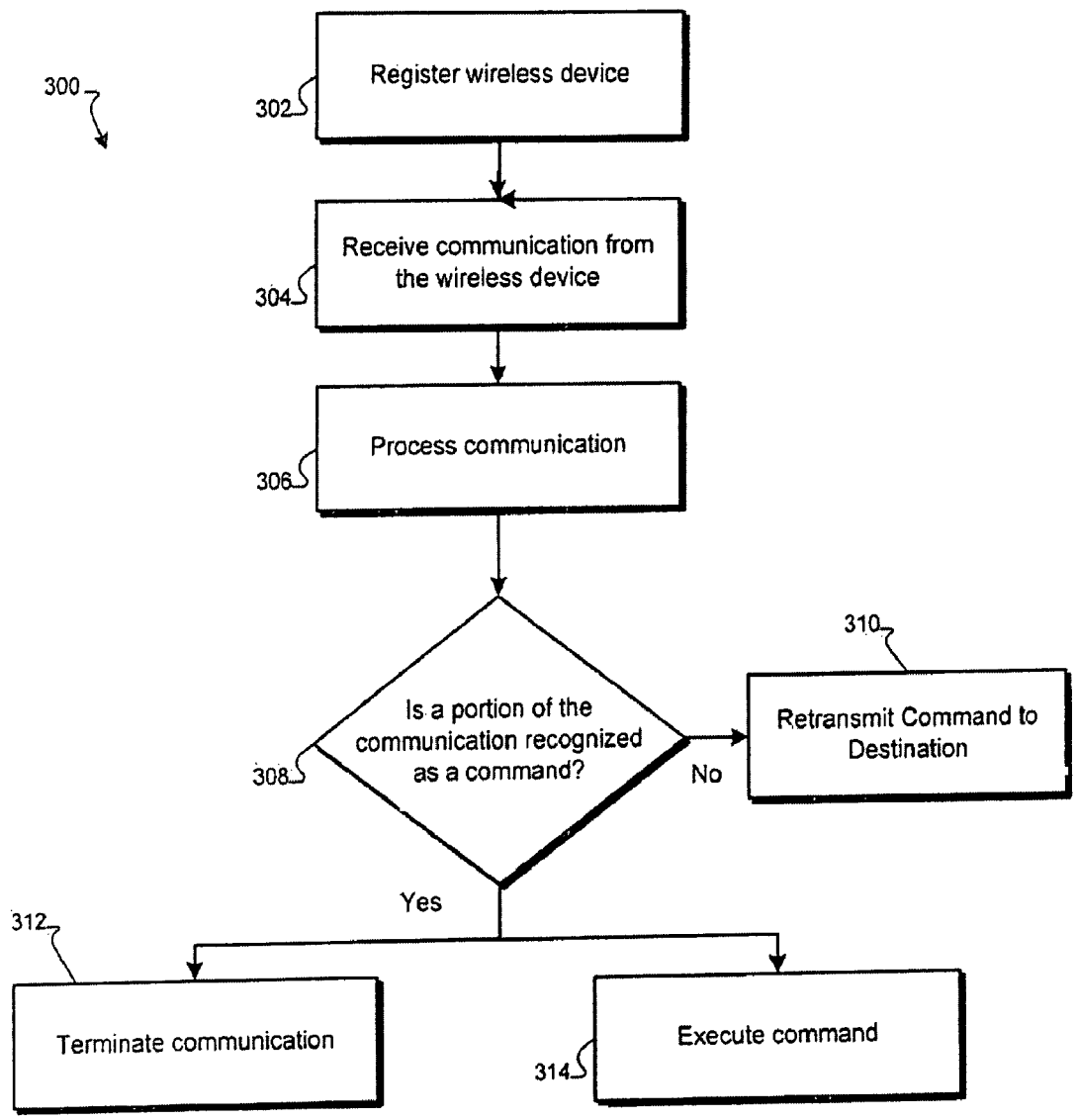
FIG. 3 is a flow chart.

For example, FIG. 3 is a flow-chart illustrating an exemplary technique 300 for wirelessly controlling a receiving device in accordance with some embodiments. In one embodiment, the technique 300 may be performed by the personal base station 202. In other embodiments, the technique 300 may also be performed by a variety of other suitable types of wireless access points or wireless devices, such as WiFi routers or media servers. However, for ease of the description, the technique 300 will be described below using the exemplary personal base station 202.

As shown by block 302, the technique 300 may begin with the personal base station 202 registering a wireless device, such as a cellular phone or computer. This registration process identifies for the personal base station 202 that a particular wireless device that is authorized to control the personal base station's properties and settings. Wireless device registration may occur when the personal base station 202 is first powered on or may be performed at another suitable time through the execution of a registration routine. Once registered, the personal base station 202 may identify the registered wireless device by its phone number, its IMEI identification number, its hardware identity (ESN/MEID), or other suitable identifier. In some embodiments, block 302 may be omitted and the personal base station 202 may be configured to accept commands from any wireless device in communication with it.

Next, as indicated by block 304, the personal base station 202 may receive a communication from a wireless device, such as the wireless device 116. In some embodiments, the communication from the wireless device 116 may be received by the personal base station 202 over a command channel, such as is the case for a SMS or text message. In other embodiments, the communication may be a wireless telephone call or other suitable wireless communication.

The communication received by the personal base station 202 are communications that are designated for retransmission by the personal base station 202 to another device or system. In other words, the received communication is a communication that is designated for transmission through the personal base station 202 to an outside destination. For example, in some embodiments, the received communication is a text message, which is intended for retransmission by the personal base station 202 to the BSC/MSC 120 and the SMSC 122. In other embodiments, the received communication is a telephone call, designated for transmission through the personal base station 202 to a mobile switching center (not shown) and eventually, possibly, to another telephone.

After receiving the communication from the wireless device 116, the personal base station 202 may scan, read, or otherwise process the received communication, as indicated by block 306. For example, in some embodiments, the personal base station 202 may scan non-address portions of the communication. In some configurations, the personal base station 202 scans the control channels of the received communication. In other embodiments, the entire communication may be scanned. To aid in this block, some embodiments of the personal base station 202 may also include a text message or SMS server to process the communication. In other embodiments, the personal base station 202 may have another system or other suitable circuitry to perform this task.

After processing the communication, the personal base station 202 may determine if any of the scanned portions of the communication are recognized as a command for the personal base station 202, as indicated by block 308. A variety of indicators may cause the personal base station 202 to recognize a portion of the communication as a command. For example, the personal access point 202 may recognize the destination phone number of a text message, such as 999-999-9999, as being indicative that the text message contains a command for the personal base station 202.

In other embodiments, the personal base station 202 may be configured to recognize a particular character or text pattern within the text of a received text message as being indicative of a command for the personal base station 202. For example, the personal base station 202 may be configured to recognize a star code (e.g., *86, *17, etc.), a phone number (e.g., 999-999-9999), or a text string (e.g., the word "add" plus a phone number) as indicating a command to the personal base station 202. In some embodiments, the personal base station 202 may recognize a non-address portion of the communication as being indicative of a command for the personal base station 202. The personal base station 202 maybe configured to recognize this character or text pattern at any point during the text message.

In some embodiments, the personal base station 202 may be configured to recognize sequences of dialed telephone digits or characters as indicative of a command. For example, the personal access point 202 may be configured to recognize that a received telephone call that starts with the characters "*95" followed by a 10-digit telephone number or other wireless device identifier, is a command to add the wireless device identified by the 10-digit telephone number to the list of approved users of the personal access point 202. The personal base station 202 maybe configured to recognize a sequence of dialed telephone digits or characters at any point during a telephone call. For example, the recognized digits may be part of a "flash" transmitted after a phone call is already in progress.

In some embodiments, the personal base station 202 may also be configured to host a web page that the personal base station's owner may be able to access using the internet capability of a smart phone. For example, the personal base station 202 may have address such as http://personalbasestation.com or http://femto. Once the owner accessed the personal base station's web site, the owner could use the web page to make changes to the personal base station's configuration.

If no portion of the communication is recognized as a command, the personal base station 202 may retransmit the communication to its destination, as indicated by block 310. For example, if a text message does not include a command, it would be retransmitted to the SMSC 122. Oh the other hand, if a portion of the communication is recognized as a command for the personal base station 202, the technique 300 may terminate the communication at the personal base station 202, as indicated by block 312. The communication is terminated at the personal base station 202 because, although the communication is of a type designated for re-transmission through the personal base station 202, the communication was actually a command for the personal access point 202. As such, retransmitting the received communication could produce undesirable results (e.g., dialing or text messaging an unintended telephone number and increasing the wireless device's telephone charges).

Lastly, the technique 300 may also involve executing the command recognized in block 308, as indicated by block 314. For example, if the recognized, command was to add a new authorized user, the personal base station 202 might add the user's telephone number to its authorized user list.

The techniques described herein can be implemented in digital electronic circuitry, or in corrupter hardware, firmware, software, or in combinations of them. The techniques can be implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone-program or as a module, component, subroutine, or other unit suitable for use in a computing environment. A computer program can be deployed to be executed on-one computer or on multiple computers at one site or distributed across multiple sites and interconnected by a communication network.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled, to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic-disks, e.g., internal hard disks or removable disks; magneto-optical disks; and CD-ROM and DVD-ROM disks. The processors and the memory can be supplemented by, or incorporated in special purpose logic circuitry.

To provide for interaction with a user, the techniques described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element, for example, by clicking a button on such a pointing device). Other kinds of devices can be used to provide for interaction with a user as well; for example, feedback provided to the user can be any form of sensory feedback, e.g., visual feedback, auditory feedback, or tactile feedback; and input from the user clan be received in any form, including acoustic, speech, or tactile input.

The techniques described herein can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an implementation of the invention, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and server are generally remote from each other and typically interact over a communication network. The relationship of client and server arises by virtue of computer programs running on the respective computers and having a client-server relationship to each other.

What is claimed is:

1. A method of wirelessly controlling a base station, the method comprising:
    receiving, at the base station, a communication from a wireless device, the communication designated for transmission through the base station to a recipient device that is external to the base station;
    recognizing a non-address portion of the communication as indicative of a command for the base station;
    performing, at the base station, one or more actions associated with the command for the base station; and
    prohibiting a transmission of the communication to the recipient device by terminating the communication at the base station.

2. The method of claim 1, wherein receiving the communication comprises receiving the communication over a cellular command channel.

3. The method of claim 1, wherein receiving the communication comprises receiving a SMS message.

4. The method of claim 1, wherein recognizing the non-address portion of the communication comprises identifying one or more characters indicative of a base station command in the communication.

5. The method of claim 1, further comprising registering the wireless device with the base station prior to receiving the communication.

6. The method of claim 1, wherein receiving the communication comprises receiving a text message.

7. The method of claim 1, wherein the communication is further designated for transmission through at least a base station controller.

8. The method of claim 1, wherein the communication is designated for transmission to a short message service center.

9. The method of claim 1, wherein receiving the communication comprises receiving an electronic message.

10. The method of claim 1, wherein receiving the communication comprises receiving a telephone call.

11. The method of claim 1, wherein the base station comprises a router.

12. The method of claim 1, wherein the base station comprises a media server.

13. A base station comprising:
    one or more processing devices:
    one or more machine-readable media configured to store instructions that are executable by the one or more processing devices to perform functions comprising:
        receiving a communication from a wireless device, wherein the communication is designated for transmission through the base station to a recipient device that is external to the base station;
        recognize recognizing the communication as a command for the base station;
        performing one or more actions associated with the command for the base station; and
        prohibiting a transmission of the communication to the recipient device by terminating the communication at the base station.

14. The base station of claim 13, wherein the one or more machine-readable media are further configured to store instructions that are executable by the one or more processing devices to perform functions comprising:
    recognizing the communication on a cellular command channel.

15. The base station of claim 13, wherein the one or more machine-readable media are further configured to store instructions that are executable by the one or more processing devices to perform functions comprising:
    executing the command.

16. The base station of claim 13, wherein the base station comprises a personal base station.

17. The base station of claim 13, wherein the communication is designated for transmission to a short message service center.

18. A method comprising:
    receiving, at a personal base station, a communication over a command channel from a wireless device, the communication designated for transmission through the personal base station to a recipient device that is external to the personal base station;
    recognizing a portion of the communication as indicative of a command for the personal base station;
    executing the command at the personal base station; and
    prohibiting a transmission of the communication to the recipient device by terminating the communication at the personal base station.

19. The method of claim 18, wherein the communication is designated for transmission to a short message service center.

20. The method of claim 18, wherein receiving the communication comprises receiving a SMS message.

21. The method of claim 18, wherein recognizing the portion of the communication comprises recognizing a sequence of characters in a non-address portion of the communication.

22. The method of claim 21, wherein recognizing the sequence of characters comprises recognizing a star code.

23. The method of claim 18, wherein executing the command comprises changing a feature of the personal base station.

24. One or more machine-readable media configured to store instructions that are executable by one or more processing devices to perform functions comprising:

receiving, at a base station, a communication from a wireless device, wherein the communication is designated for transmission through the base station to a recipient device that is external to the base station;

recognizing the communication as a command for the base station;

performing, at the base station, one or more actions associated with the command for the base station; and prohibiting a transmission of the communication to the recipient device by terminating the communication at the base station.

25. The medium of claim 24, wherein the communication is designated for a short message service center.

26. The medium of claim 24, wherein the communication is designated for a radio network controller.

* * * * *

UNITED STATES PATENT AND TRADEMARK OFFICE
CERTIFICATE OF CORRECTION

PATENT NO. : 7,933,619 B2  Page 1 of 1
APPLICATION NO. : 11/866238
DATED : April 26, 2011
INVENTOR(S) : Woojune Kim It is certified that error appears in the above-identified patent and that said Letters Patent is hereby corrected as shown below:

Column 8, Line 24, in Claim 13, before "recognizing" delete "recognize".

Signed and Sealed this
Twenty-eighth Day of June, 2011

David J. Kappos
*Director of the United States Patent and Trademark Office*